United States Patent
Takahashi

[11] Patent Number: 5,947,159
[45] Date of Patent: Sep. 7, 1999

[54] FIRE RETARDING DIVISION PENETRATING MEMBER

[75] Inventor: Jiro Takahashi, Tokyo, Japan

[73] Assignee: Tosetz Co., Ltd., Tokyo, Japan

[21] Appl. No.: 08/928,373

[22] Filed: Sep. 12, 1997

[30] Foreign Application Priority Data

Sep. 18, 1996 [JP] Japan ................................. 8-245833

[51] Int. Cl.⁶ .............................. F16L 9/00; F16K 17/38
[52] U.S. Cl. ...................... 138/156; 138/166; 138/167; 138/128; 52/232
[58] Field of Search .................... 138/156, 162, 138/166, 167, 168, 110, 128; 137/75; 52/232

[56] References Cited

U.S. PATENT DOCUMENTS

| | | | |
|---|---|---|---|
| 2,825,673 | 3/1958 | Tschappu | 138/166 X |
| 3,682,163 | 8/1972 | Plummer | 138/166 X |
| 4,064,359 | 12/1977 | Peterson et al. | 428/268 X |
| 4,221,092 | 9/1980 | Johnson | 52/232 |
| 4,273,879 | 6/1981 | Langer et al. | 521/91 |
| 4,433,732 | 2/1984 | Licht et al. | 138/167 X |
| 4,442,154 | 4/1984 | Fortsch et al. | 138/156 X |
| 4,513,173 | 4/1985 | Merry | 138/103 X |
| 4,513,787 | 4/1985 | Hegler et al. | 138/166 |
| 4,517,234 | 5/1985 | Fisher | 138/156 X |
| 4,538,389 | 9/1985 | Heinen | 52/232 |
| 4,796,401 | 1/1989 | Wexler | 52/232 |
| 4,848,043 | 7/1989 | Harbeke | 52/232 X |
| 4,850,385 | 7/1989 | Harbeke | 52/232 X |
| 5,105,592 | 4/1992 | MacMillan et al. | 52/232 |
| 5,347,767 | 9/1994 | Roth | 52/232 X |

*Primary Examiner*—Patrick Brinson
*Attorney, Agent, or Firm*—McGlew and Tuttle, P.C.

[57] ABSTRACT

An elastic metal sheet member with thermal expansion material being lined on its internal face is curved to a C-letter shape. A claw is formed downward to a opening side tip, and a engaging mouth is formed to the opposite opening side tip. In this structure, the penetrating member can be fitted to the piping "A" or can be detached from it only by pressing the elastic metal sheet for its contraction in diameter with one hand.

8 Claims, 7 Drawing Sheets

FIRE RETARDING DIVISION PENETRATING MEMBER

FIELD OF THE INVENTION

The present invention relates to a fire retarding division penetrating member. More particularly, this invention relates to a penetrating member forming a through hole which has been structured so as to be able to block the through-hole by the material being expanded by the heat if a fire disaster should happen in order to prevent the fire, smoke, poisonous gas, etc. from flowing into the adjacent rooms via the through-holes of piping, cable. etc. penetrating through the fire retarding division when a fire disaster should happen.

BACKGROUND OF THE INVENTION

A so-called fire retarding division penetrating member is known which is fitted in its interior with the thermal expansion material is mounted to the resin pipe or cable, etc. for water supply. hot water supply, etc. in the portion penetrating through the fire retarding division. This member has the function for blocking the through-bole by collapsing the resin pipe and octopus pipe with the expansion pressure wherein such thermal expansion material is thermally swollen by the heat of the fire disaster when it has occurred, thereby preventing the fire, smoke poisonous gas etc. from invading into the adjacent rooms via the through-holes.

This type of fire retarding division penetrating member, the two-split structure of upper half member 50 and lower half member 51, has conventionally been the main one as shown in FIG. 15. These two-split members 50 and 51 do not simply form the ribs 52, 52' and 53, 53' on the mating faces but also install the slide system engaging means to these ribs 52, 52' and 53, 53' respectively, thereby fixing (coupling) the upper half member 50 and the lower half member 51, or fixing them with the bolts and nuts. Numerals 54 and 55 in the figure are the thermal expansion materials.

For this reason, the members of a conventional two-split structure involves the defects as follows.

a. The mounting work takes much troubles because the upper half member 50 and the lower half member 51 must be mated with each other from upper and lower sides and then must be fixed when fitting them to the piping. etc.

b. If the ribs 52, 52' and 53, 53' should protrude or the bolts and nuts should be used, it is difficult to fill the mortar or putty for fixing the members in the-through-holes entirely around the members.

c. Unless the through-holes should be opened to large sizes when mounting the members to the existing piping, etc., it is impossible to enter the two-split members into the holes for fitting them. Therefore, much trouble and expense is involved in the work execution, and moreover, after a repair, the fine view of the through-hole portion will be impaired.

SUMMARY AND OBJECTS OF THE INVENTION

It is the primary object of the present invention to provide such a contrivance that the fire retarding division penetrating member can be fitted to the piping, etc. in one-touch and such that the above mentioned defects a) through c) can be overcome.

According to the invention, a fire retarding division penetrating member is provided wherein an elastic metal sheet is not only curved to a C-letter shape but coupling means are also formed to both the ends in a curved direction of the elastic metal sheets which have been curved to a C-letter shape, and moreover a thermal expansion material is fitted to the inside of this elastic metal sheet.

Further according to the invention, the fire retarding division penetrating member is provided with a coupling means on one side which is a claw and with a coupling means on the other side which is an engaging hole to which the claw gets engaged.

If the opened portion of penetrating member of C-shape should be pressed against the piping when fitting the penetrating member to the piping, etc., the member can be easily fitted while opening it, more or less, with its elasticity action. Because the penetrating members are still opened at this stage, the claw on one side gets hooked to the engaging mouth on the other side if the tip of the opened side of this penetrating member should be narrowed and closed so that its diameter may be shrunk. Furthermore, the respects of treating and finishing the through-holes and the surrounding of members utilizing the mortar or putty. etc. are similar to the conventional case.

The penetrating member in the present invention is the elastic metal sheet of optional length which has been curved to a C-letter shape, and the thermal expansion material mated to the outer circumference of piping and the like is fitted to its inside. The compound is of the nature which is foamed when heat is applied to the thermal expansion material. For example, this is the compound where the inorganic system foaming agent such as expensive graphite, poly phosphoric acid ammonium and so forth is compounded to the base resin like the poly vinyl chloride. ethylene-ethyl acrylate copolymer, etc.

A pawl is formed as a fixing means to the tip in curved direction of curved elastic metal sheet, and this pawl is formed in an opposite direction to the curved direction so that it may get engaged to the engaging mouth provided to the opposite end side against its disengagement. Therefore. if the elastic metal sheet should be narrowed to the diameter contracting direction, the claw can be easily disengaged and the elastic metal sheet may be restored (opened) to the original C-letter shape by its elastic action.

When contracting the diameter of elastic metal sheet for its locking, it may also be acceptable to bend both the ends respectively to the opposite directions to keep them formed to a hook shape and hook them to each other in addition to the system where both the ends are overlapped and the claw is engaged to the engaging mouth.

A plurality of claws and engaging mouths may be provided according to the necessity.

The various features of the novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
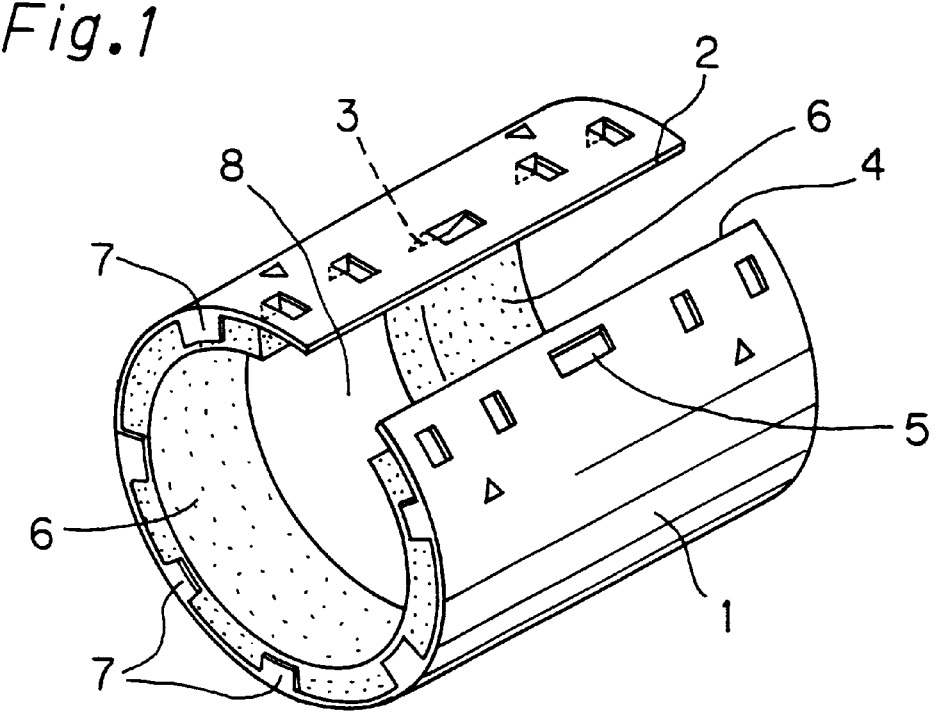
FIG. 1 is an oblique view of the penetration member relating to the present invention.

Referring to the drawings in particular, FIG. 1 is an oblique view of penetrating member relating to this invention. This penetrating member is a structure including an elastic metal sheet 1 which is curved to a C-letter shape. A claw 3 is formed with protrusions extending to a backward direction in the cut-out system inside the opening side tip-2 at-this center and a square engaging mouth 5 is formed at the opening side tip 4 on the opposite side or at the position opposing to the claw 3.

First and second portions of a thermal expansion material 6 is fitted inside the curved elastic metal sheet 1, and Numeral 7 is a fixing strip fixing these portions of thermal expansion material 6 inside the elastic metal sheet 1. The first and second portions of thermal expansion material 6 are positioned at opposite axial ends of the C-letter shape and are spaced from each other as shown in FIG. 1.

Figure 2:
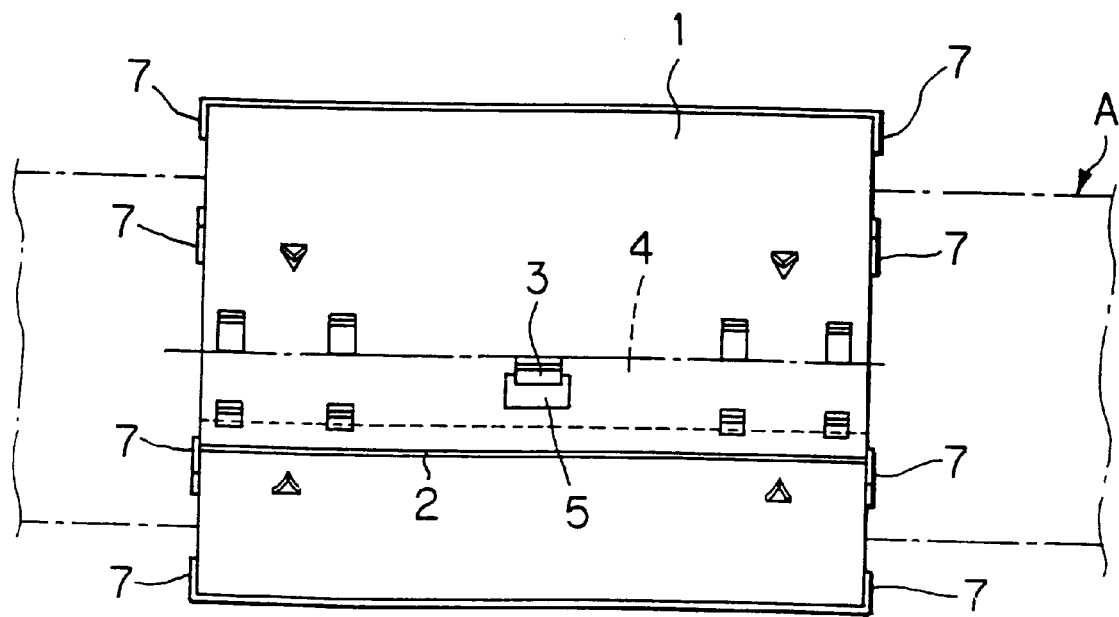
FIG. 2 is a lateral side view showing the state after having closed the penetrating member.
Figure 3:
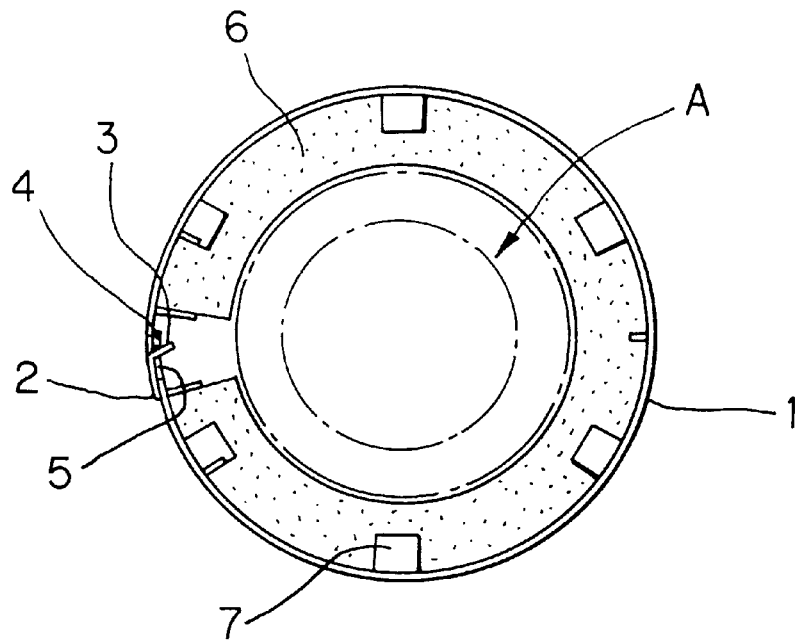
FIG. 3 is a front view showing the state after having closed the penetrating member.
Figure 4:
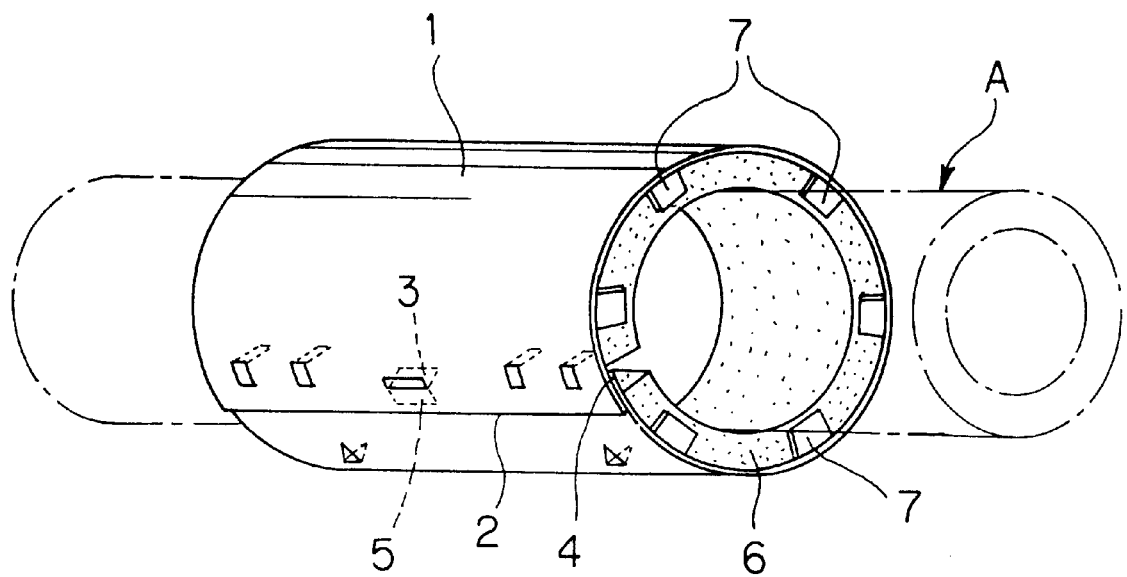
FIG. 4 is an oblique view showing the state after having closed the penetrating member.
Figure 5:
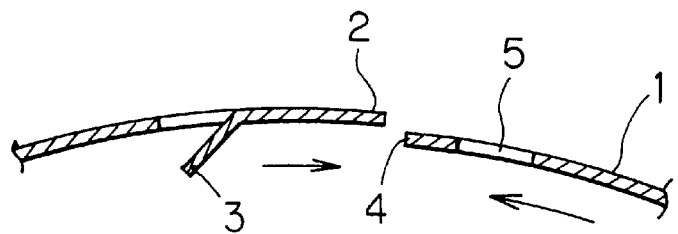
FIG. 5 is an explanatory sectional view showing the state before the claw and the engaging mouth are engaged with each other.
Figure 6:
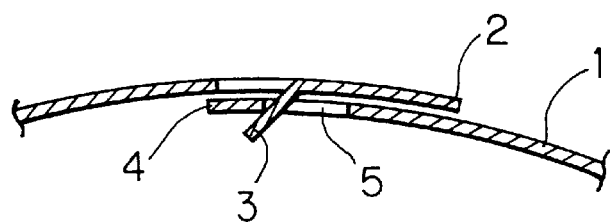
FIG. 6 is an explanatory sectional view showing the state after the claw and the engaging mouth have been engaged.

FIG. 2, FIG. 3 and FIG. 4 are explanatory views showing the state of holding the piping "A" inside the penetrating member when the tips 2 and 4 of opening elastic metal sheet 1 should be approached (contracted in the circumferential direction) to the arrow mark direction as shown in FIG. 5. The claw 3 gets engaged inside the engaging mouth 5 as shown in FIG. 6 after the claw 3 and the engaging mouth 5 are coincident with each other. As a result, when your hand is released, the elastic metal sheet 1 tends to open due to the action by its elasticity, but can not open due to the engagement between the claw 3 and the engaging mouth 5. However, if the outside of elastic metal sheet 1 should be pressed for its contraction in diameter, the claw 3 slides up above the engaging mouth 5, and therefore the claw 3 gets disengaged from the engaging mouth 5 and the elastic metal sheet 1 opens like in its original state by pressing a bit down the tip 4 on the side (inside) of engaging mouth. Numeral 8 in FIG. 1 is an opening portion of curved elastic metal sheet 1.

Figure 7:
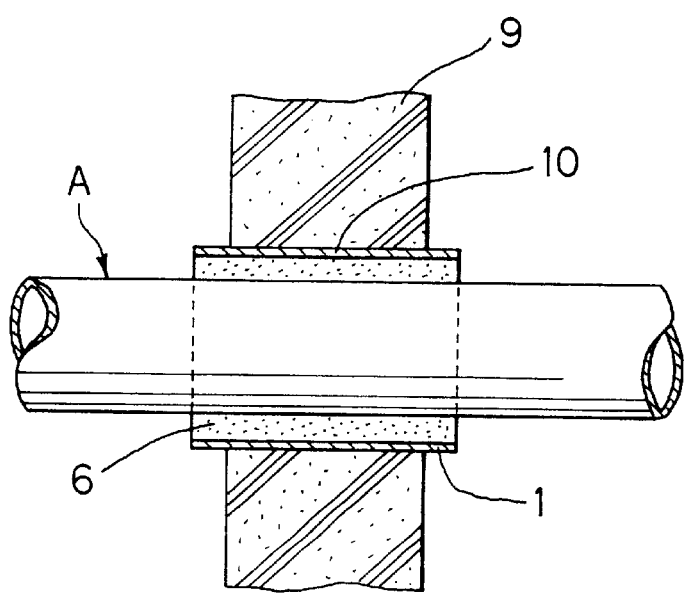
FIG. 7 is an explanatory partially sectional view showing the state after having mounted the member to the division wall.
Figure 8:
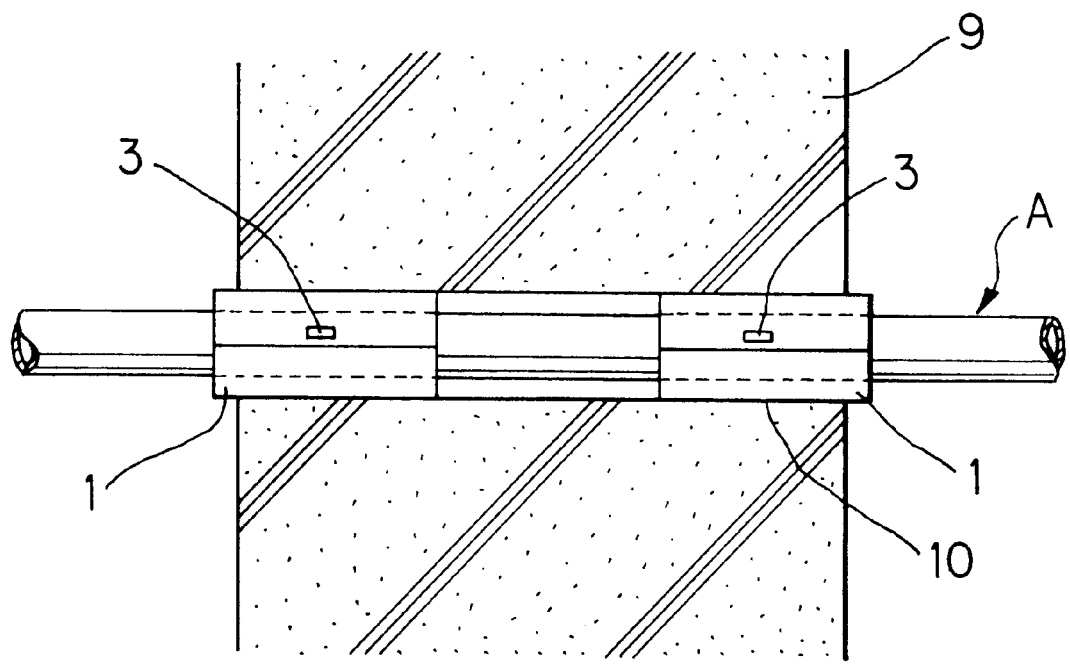
FIG. 8 is an explanatory partially sectional view showing the use of two pieces of penetrating member.
Figure 11:
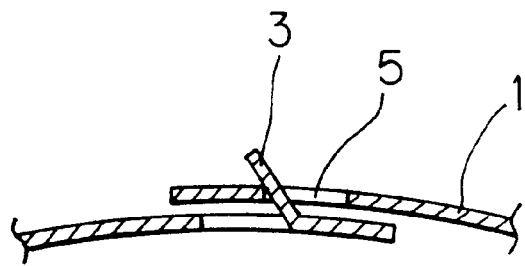
FIG. 11 is an explanatory sectional view in the case of having formed the claw with it being directed upward.

FIG. 7 is an explanatory view showing the state of laying out (penetrating) the resin pipe using the penetrating member relating to this invention inside the through-hole 10 of division wall 9. FIG. 7 shows the case where the division wall 9 is thin, but if this division wall 9 is thick, 2 pieces of penetrating member may be used inside the through-hole. Or, a long penetrating member may also be used. An indication of mortar is omitted in FIG. 7 and FIG. 8.

Figure 9:
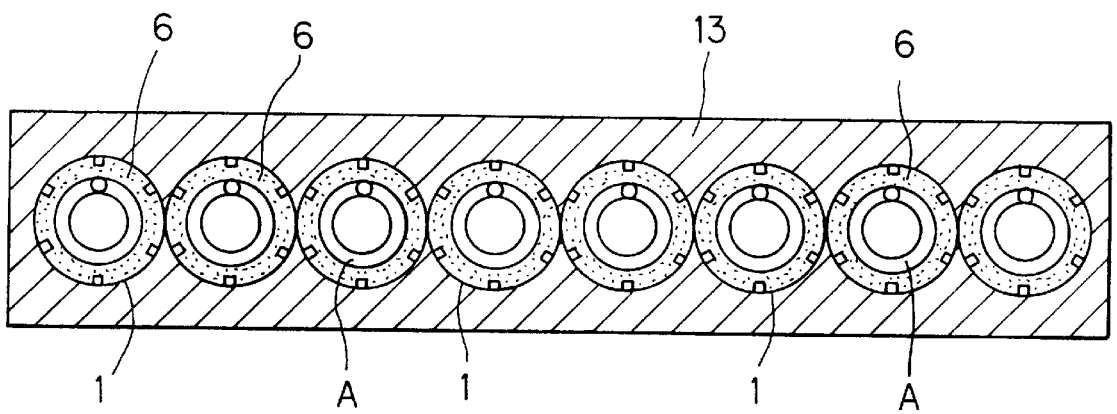
FIG. 9 is an explanatory partially sectional view of the example of the respective penetrating members being mounted to 8 pipes.
Figure 10:
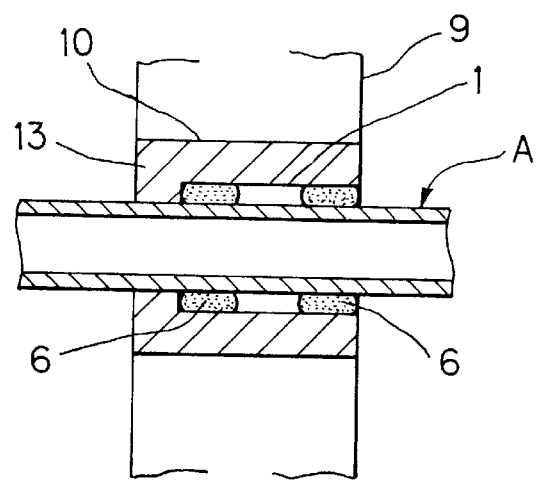
FIG. 10 is an explanatory partially sectional view of the example of a sided penetrating member disposed to the wall face on one side for its fitting.

FIG. 9 is an example of the case of penetrating 8 pipes "A" inside the through-hole 10, and the gap between the through-hole 10 and the penetrating member (elastic metal sheet 1) being buried with the mortar 13. FIG. 10 is an embodiment where the penetrating member is aided and fitted to the wall face on one side.

Figure 12:
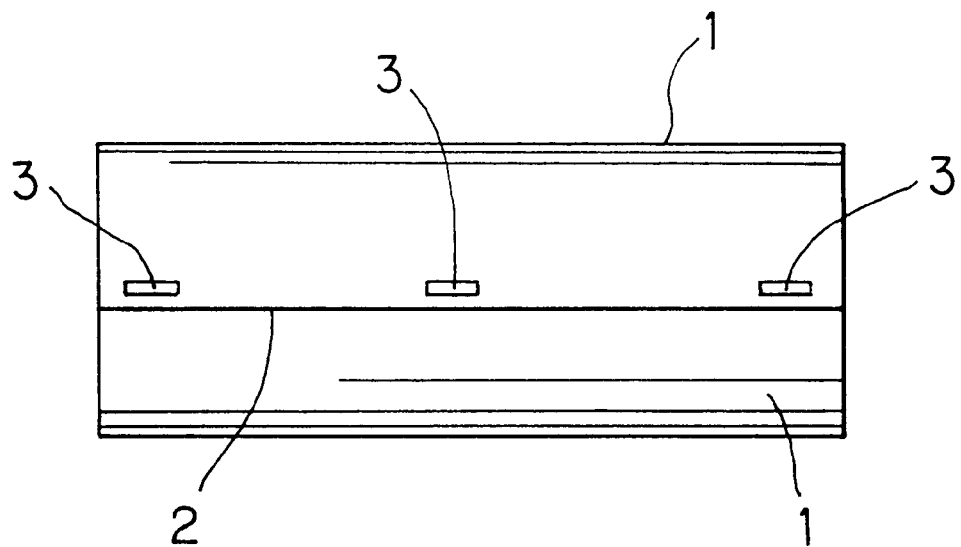
FIG. 12 is an explanatory view in the case of having installed the claw at 3 places.
Figure 13:
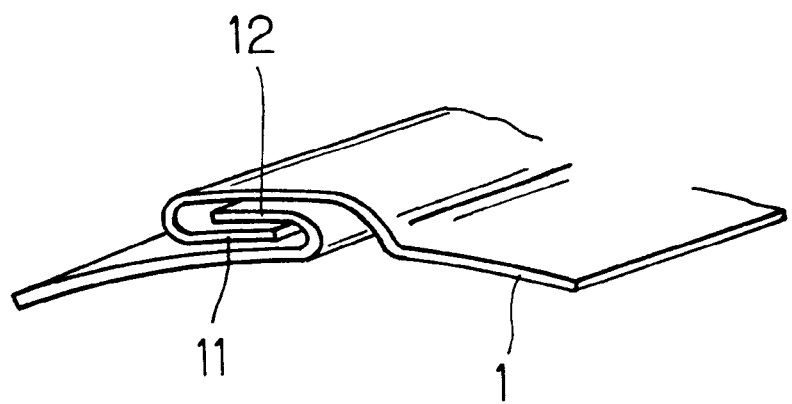
FIG. 13 is an explanatory view in the case of trying to bend both the ends of elastic metal sheet for its fixation.

Fig, 11 is an explanatory view of the embodiment in the structure where the side of claw 3 may be directed upward in the elastic metal sheet 1. FIG. 12 is an explanatory view of the embodiment where the claw is provided at 3 places, and FIG. 13 is an explanatory view of the embodiment where the tips 2 and 4 of elastic metal sheet 1 are folded to the outside and inside respectively to form the book state engaging brims 11 and 12 so that both the ends of elastic metal sheet 4 may be coupled here.

Figure 14:
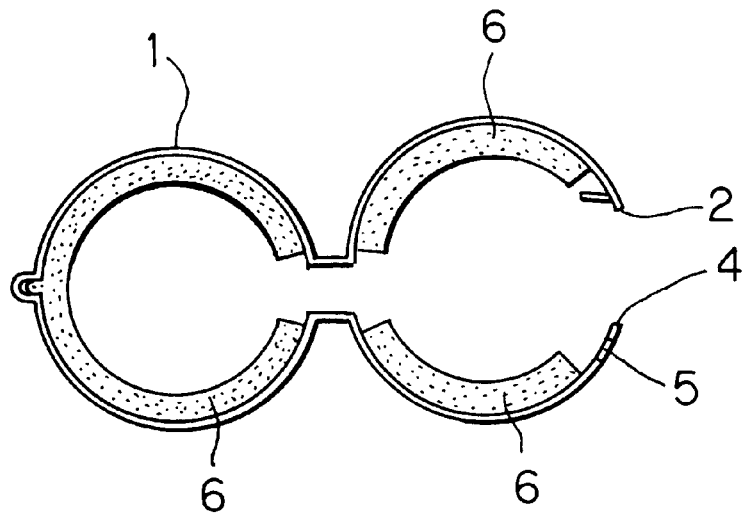
FIG. 14 is an explanatory view of a penetrating member relating to this invention, which holds two pipes.
Figure 15:
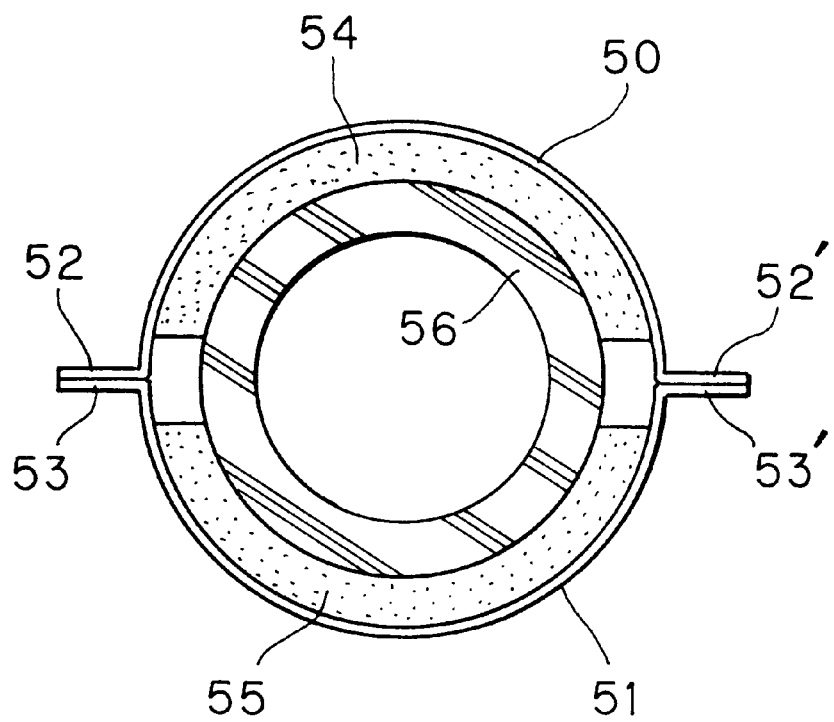
FIG. 15 is an explanatory view of conventional two-split type penetrating member.

FIG. 14 shows an embodiment of elastic metal sheet (penetrating member) which is structured so as to be able to hold two pipes at the same time, and the coupling means of opening portion a is identical to the above mentioned embodiment.

Because the present invention not only has curved the elastic metal sheet to a C-letter shape but also formed the coupling means consisting of a claw, an engaging mouth, etc. to the tip of opened side of elastic metal sheet curved to this C-letter shape, the metal sheet can be fitted in one touch control of pressing the elastic metal sheet, from outside and contracting it in its diameter after extrapolating the penetrating member into the piping from the C-letter shape opening portion.

As a result, not only the metal sheet can be easily fitted with one hand but it can also be detached easily.

Next, because the outside of elastic metal sheet is only curved with no protrusions especially thereon, the mortar, putty, etc. Invade uniformly into the circumference inside the through-hole of the division wall, being able to securely fix the piping. Further, because the through-hole can be made comparatively smaller as compared with tho conventional split type, there is no fear for inviting or causing a drop in wall strength or impairing the fine view by providing a large through-hole especially when mounting it to the existing through-hole later.

While a specific embodiment of the invention has been shown and described in detail to illustrate the application of the principles of the invention, it will be understood that the invention may be embodied otherwise without departing from such principles.

What is claimed is:

1. A fire retarding division penetrating member, comprising:

an elastic metal sheet curved to a C-letter shape, the metal sheet having ends;

coupling means with coupling portions formed adjacent to both ends of said elastic metal sheet; and a thermal expansion material fitted to an inside of said elastic metal sheet, said thermal expansion material including a first portion positioned at a first axial end of said C-letter shape and a second portion positioned at a second axial end of said C-letter shape, said first and second portions being spaced from each other.

2. A fire retarding division penetrating member according to claim 1, wherein said coupling means of one of said ends is a claw and said coupling means of another of said ends is an engaging hole to which the said claw gets engaged.

3. A fire retarding division penetrating member formed by the steps of comprising:

curving an elastic metal sheet to a C-letter shape, the metal sheet having ends;

forming coupling means with coupling portions adjacent to both ends of said elastic metal sheet; and fitting a thermal expansion material to an inside of said elastic metal, sheet, said thermal expansion material including a first portion positioned at a first axial end of said C-letter shape and a second portion positioned at a second axial end of said C-letter shape, said first and second portions being spaced from each other.

4. A fire retarding division penetrating member formed according to claim 3, wherein said coupling means of one of said ends is a claw and said coupling means of another of said ends is an engaging hole to which the said claw gets engaged.

5. A fire retarding division penetrating member formed according to claim 3, further comprising: fitting the member to a pipe by pressing the elastic metal sheet, from outside and contracting it, in its diameter, after extrapolating the penetrating member into the piping from the C-letter shape opening portion, and engaging the coupling means.

6. A process for creating a fire retarding division around a pipe in a wall, the process comprising the steps of:

providing an elastic metal sheet curved to a C-letter shape, the metal sheet having ends and having a thermal expansion material fitted to an inside of said elastic metal sheet;

providing coupling means with coupling portions formed adjacent to both ends of said elastic metal sheet;

fitting said C-letter shape to the pipe by pressing the pipe through an opening of said C-shape;

engaging the coupling means;

placing said C-letter shape in the wall.

7. A process in accordance with claim 6, wherein:

said coupling means of one of said ends is a claw and said coupling means of another of said ends is an engaging hole to which the said claw gets engaged.

8. A process in accordance with claim 6, wherein:

said thermal expansion material including a first portion positioned at a first axial end of said C-letter shape and a second portion positioned at a second axial end of said C-letter shape, said first and second portions are spaced from each other.

* * * * *